United States Patent
Piasseski

(10) Patent No.: US 12,436,023 B2
(45) Date of Patent: Oct. 7, 2025

(54) SYSTEM AND METHOD FOR SOLIDS MEASUREMENT ON SAND SEPARATOR ACCUMULATORS

(71) Applicant: MTC AMERICAS, LLC, Wilmington, DE (US)

(72) Inventor: Diogo Cesar Piasseski, Dubai (AE)

(*) Notice: Subject to any disclaimer, the term of this patent is extended or adjusted under 35 U.S.C. 154(b) by 337 days.

(21) Appl. No.: 18/363,304

(22) Filed: Aug. 1, 2023

(65) Prior Publication Data

US 2024/0247972 A1    Jul. 25, 2024

Related U.S. Application Data

(60) Provisional application No. 63/440,997, filed on Jan. 25, 2023.

(51) Int. Cl.
*G01G 23/08* (2006.01)
*G01G 7/00* (2006.01)

(52) U.S. Cl.
CPC ............. *G01G 23/08* (2013.01); *G01G 7/00* (2013.01)

(58) Field of Classification Search
CPC .......... G01G 23/08; G01G 7/00; G01G 17/04
USPC .......................................................... 177/1
See application file for complete search history.

(56) References Cited

U.S. PATENT DOCUMENTS

| | | | |
|---|---|---|---|
| 9,821,257 B2 | 11/2017 | Arefjord | |
| 10,953,411 B2 | 3/2021 | Bowley | |
| 11,136,874 B2 | 10/2021 | Arefjord et al. | |
| 11,173,427 B2* | 11/2021 | Bayati | B01D 19/0057 |
| 11,326,929 B2 | 5/2022 | Sinker et al. | |
| 11,351,481 B1* | 6/2022 | Pitcher | B01D 21/302 |
| 11,938,422 B2* | 3/2024 | Malone | B01D 21/2411 |
| 2020/0378815 A1* | 12/2020 | Jiang | G01F 23/0007 |
| 2021/0010364 A1 | 1/2021 | Sinker et al. | |

FOREIGN PATENT DOCUMENTS

| | | |
|---|---|---|
| EP | 3768942 | 1/2021 |
| GB | 2529779 | 2/2016 |

* cited by examiner

*Primary Examiner* — Jacques M Saint Surin
(74) *Attorney, Agent, or Firm* — Kenneth L. Nash; Thomas D. Nash

(57) ABSTRACT

A system for weight measurement of solids in a flow stream. The system collects the solids from the flow stream in a recipient that is slidably mounted within a pressurized accumulator vessel, which is pressurized with a variable pressure due to the flow stream. A recipient stem connects the weight of the recipient to a load cell. A force on the recipient stem includes both the force of the weight of the solids and a force produced by the variable pressure acting on the cross-sectional area of the recipient stem. The variable pressure is also applied to a compensating stem to produce a compensation force that is used to cancel out the force acting on the recipient stem due to the variable pressure.

17 Claims, 2 Drawing Sheets

SYSTEM AND METHOD FOR SOLIDS MEASUREMENT ON SAND SEPARATOR ACCUMULATORS

BACKGROUND

The present invention relates generally to the measurement of accumulated sand after it is separated from the flow stream (by any of the multiple available processes, such as cyclonic desanders, gravity separators, filters and others) for use in a pressurized system, e.g., with pressure vessels.

It will be appreciated that in making such measurements those of skill need to account for the fluid in the flow stream and in the pressure vessel possibly being flammable and toxic apart as well as at high pressures, which may hinder these measurements.

In the oil and gas exploration, development and production, due to the nature of the reservoir, such as unconsolidated sandstone formations, or the methods applied to allow the hydrocarbons extraction from underground, such as hydraulic fracturing, or even during the well maintenance (work over operations) solids may be present in the stream that flow to the surface installations (temporary or permanent). For that reason, the use of devices that capture the sand become a regular practice, sand is removed from the stream, using a variety of separation methods, to avoid the problems associated with the solids in the stream, such as erosion, accumulation, plugging, etc. The separation of the sand can be achieved in many ways, by the use of cyclonic, filter or gravity devices.

Once the sand is removed from stream, it is accumulated typically under high pressure. In most cases, there are limited methods or devices available to measure the accumulated solids. The prior art quantification of produced solids has been time consuming, inaccurate or non-economical or unsafe, among other limitations.

However, the understanding of sand production and trough quantification of the solids has several applications and benefits. Operational practices would be greatly benefited by real time or near real time measurements. For example, reduction of equipment damage due to the ability to know the status of the amount of sand in the flow stream. Other very important benefits include improving hydrocarbon production and optimizing the reservoir development plans.

Those of skill will appreciate the present invention that addresses the above concerns and benefits as well as others not listed above.

SUMMARY OF THE INVENTION

One general aspect includes a system for weight measurement of solids in a flow stream. The system includes an accumulator vessel connected to receive the flow stream. The system also includes a recipient mounted in the accumulator vessel to receive solids from the flow stream. The system also includes a load cell positioned outside of the accumulator vessel. The system also includes a recipient stem connected to the recipient and to the load cell. The system also includes a compensating vessel. The system also includes a compensator pressure feeding connection that fluidly connects between the accumulator vessel and the compensating vessel. The system also includes a compensating stem that extends into the compensating vessel and connects to the load cell.

Implementations may include one or more of the following features. The system where the recipient stem is positioned above the load cell and the compensating stem is positioned below the load cell when the system is in an operating configuration. The system may include a hydrocarbon recovery system, and programming that utilizes weight measurement data produced by the load cell for controlling the hydrocarbon recovery system. Implementations of the described techniques may include hardware, a method or process, or computer software on a computer-accessible medium.

One general aspect includes a method for weight measurement of solids in a flow stream. The method also includes connecting the flow stream to an accumulator vessel where a variable pressure from the flow stream is contained by the accumulator vessel; inserting solids into a recipient mounted in the accumulator vessel, connecting a recipient stem between the recipient and a load cell positioned outside of the accumulator vessel, applying a force to the load cell through the recipient stem that includes a weight force due to a weight of the solids in the recipient and a variable pressure force due to the variable pressure acting on the recipient stem, applying the variable pressure to a compensating stem to produce a compensating force. The method also includes utilizing the compensating force to more accurately determine the weight of the solids in the recipient. Other embodiments of this aspect include corresponding computer systems, apparatus, and computer programs recorded on one or more computer storage devices, each configured to perform the actions of the methods.

Implementations may include one or more of the following features. The method where the step of applying the variable pressure to the compensating stem may include inserting the compensating stem into a compensating vessel that is fluidly connected to the accumulator vessel. The method may include connecting the compensating stem to the load cell. The method may include positioning the recipient stem above the load cell and the compensating stem below the load cell. The method may include providing programming that utilizes weight measurement data produced by the load cell for controlling a hydrocarbon recovery system. Implementations of the described techniques may include hardware, a method or process, or computer software on a computer-accessible medium.

One general aspect includes a system for weight measurement of solids in a flow stream. The system also includes an accumulator vessel connected to receive the flow stream; the accumulator vessel being constructed to be able to contain a variable pressure. The system also includes a recipient mounted in the accumulator vessel to receive solids from the flow stream. The system also includes a load cell positioned outside of the accumulator vessel. The system also includes a recipient stem connected to the recipient and to the load cell so as to apply weight of the solids in the recipient to the load cell, the recipient stem being connected so that the variable pressure is applied to the recipient stem. The system also includes a compensating stem that is connected to receive the variable pressure and produce a force acting on the compensating stem. Other embodiments of this aspect include corresponding computer systems, apparatus, and computer programs recorded on one or more computer storage devices, each configured to perform the actions of the methods.

Implementations may include one or more of the following features. The system may include a compensating vessel, a compensator pressure feeding connection that fluidly connects between the accumulator vessel and the compensating vessel, and the compensating stem being connected to receive the variable pressure by being inserted into the compensating vessel. The recipient stem is positioned above the load cell and the compensating stem may be positioned below the load cell when the system is in an operating configuration. The system may include a hydrocarbon recovery system, and programming that utilizes weight measurement data produced by the load cell for controlling the hydrocarbon recovery system. Implementations of the described techniques may include hardware, a method or process, or computer software on a computer-accessible medium.

BRIEF DESCRIPTION OF THE DRAWINGS

The following detailed description and claims are merely illustrative of the generic invention. Additional modes, advantages, and particulars of this invention will be readily suggested to those skilled in the art without departing from the spirit and scope of the invention. A more complete understanding of the invention and many of the attendant advantages thereto will be readily appreciated by reference to the following detailed description when considered in conjunction with the accompanying drawings, wherein like reference numerals refer to like parts and wherein:

DETAILED DESCRIPTION

Sand separation devices always lead to the accumulation of the removed sand in a dedicated compartment with the same pressure as the stream. Due to the harsh flow conditions, pressure, temperature, toxic and flammable fluids, having this sand transferred to an "easier" location for measurement and treatment isn't possible in most cases.

When possible, the accumulated sand is sometimes transferred in batches to low-pressure boxes. For some cases, accumulated solids can be manually measured. But these solutions do not present the benefit of real time or near real time response. For example, the real time identification of when the sand started to accumulate and when the accumulation may be reaching the limits of the accumulator is not detectable if the measurement is indirect. The real time reliable detection and quantification of solids removed from the stream has the potential to unlock operational performance and safety improvements for work over and flowback activities, by allowing better operational decisions.

Figure 1:
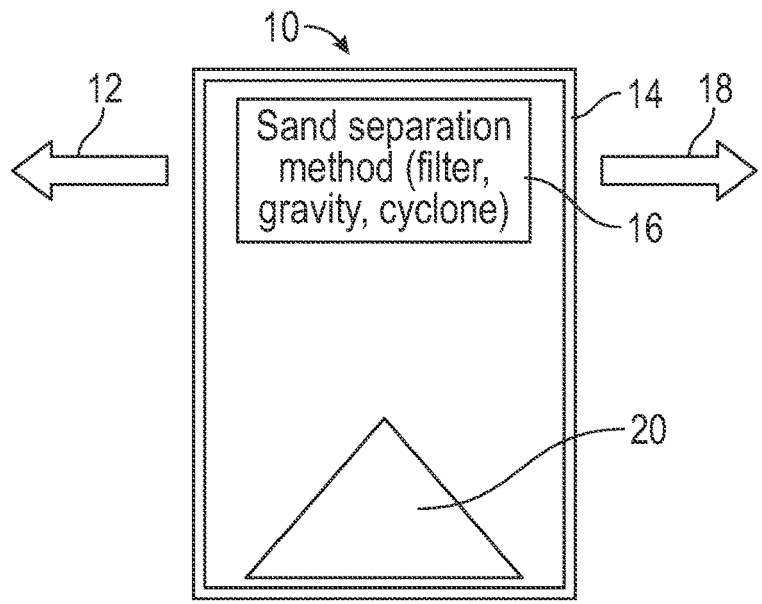
FIG. 1 is a high-level operation description diagram that gives an overview of sand separation devices.

In FIG. 1, a basic description of the operation setup 10 can be seen. The Flow stream 12 containing solids flow into accumulator 14, which is the pressure containing equipment. The flow through results in separation methods 16, which have two basic outcomes—the Flow stream without solids 18 and the retained solids 20 that are accumulated at the process pressure, by the pressure containing equipment 14. Accumulator vessels 14 may be single or dual with isolation valves between. Several retaining devices 14 and separation methods 16 are used. The present description is mainly for vertical separation devices, like sand filters, cyclonic desanders and some horizontal devices like gravity separators (not shown), as long as the solids settle in the bottom of the accumulator 14.

Figure 2:
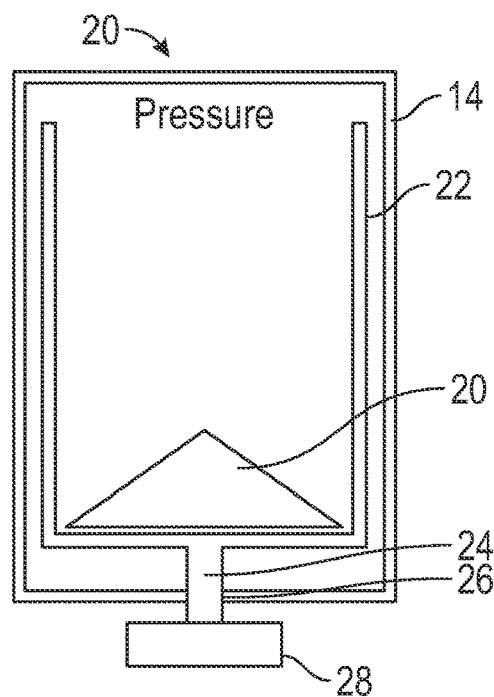
FIG. 2 is a diagram of a prior art external load cell system/method.

FIG. 2 describes a prior art external load cell mechanism/method to address the measurement of accumulated solids 20. The solids are accumulated at process pressure in a bucket or recipient 22 that is slidably mounted within accumulator vessel 14. The recipient 22 is supported by a Stem 24 that contains a seal 26 that allows the stem 24 to movably extend outside the pressure vessel 20 and connect to external load cell 28 from above the external load cell 28. The external load cell 28 will sense a combination of weight of solids 20, weight of recipient 22, weight of stem 24, friction between moving components, and force from the pressure over the stem 24 cross-sectional area. One or more pressure sensors 30 can be used to measure the process pressure. Since pressure can be measured, and because the stem weight/size and recipient weight are known, these factors could theoretically be deducted from the measurement made by load cell 28 to determine the weight of accumulated solids 20 except for the problem below. More specifically, factors that affect accuracy include the friction of the bucket with the accumulator wall and the friction of the seals of the stem. The load cell may be referred to as a weight measurement device herein. While any suitable weight measurement device could be used, load cells are the most commonly used.

However, because the separation process has many pressure variations due to the solids in the flow, turbulence, and the like, the method of FIG. 2 results in significant pressure measurement inaccuracies. Pressure variations even if small will result in loads that can be big enough to create noise to mask the eventual presence of solids in the accumulator vessel. The flow nature, with slugs or pulsed flow, will lead to variations of pressure and consequently the load reading, which can be big enough to overcome real solid deposition on the accumulator. One alternative of the method of FIG. 2 is to additionally perform the measurements at atmospheric pressure. By this is meant that once the accumulator is depressurized, the accuracy of the solids' weight measurements will increase since the pressure component is no longer present. Depending on the capabilities of the pressure compensation algorithms used to determine pressure, the pressurized results may be noisy and lead to resolution losses and lack of reliability.

Figure 3:
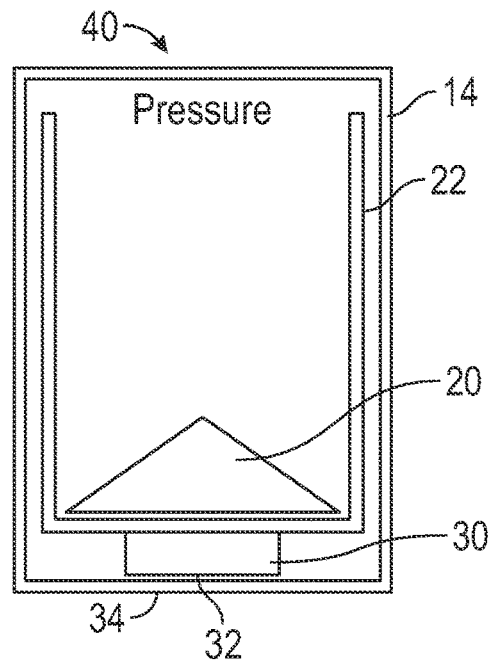
FIG. 3 is a diagram of another prior art internal load cell system/method.

FIG. 3 describes internal load cell mechanism 40 to address the measurement of accumulated solids. Since the previous FIG. 2 solution has limited performance due to the process pressure upsets, this solution of FIG. 3 utilizes an internal load cell 30 mounted inside the pressure vessel 14. The electric signal cable 34 of the internal load cell 30 is then sealed 34 to allow the cable 32 to extend outside of the pressure vessel for signal treatment. This method eliminates several measurement issues related to pressure variations and the forces created by pressure that need to be subtracted as a post process of the signal reading. But these measurement benefits come with limitations. The exposure of the sensitive internal load cell to a harsh environment may lead to failures. Also, the sealing of cable 32 in high pressure environment is not a common practice in sour environments (presence of toxic gas). Although the theoretical concept seems to be very favorable for the accuracy of the measurements, the engineering features for a successful implementation are very complex, and a failure in achieving that will lead to unavailability of the measurement or even worst, integrity/electrical safety risks.

Figure 4:
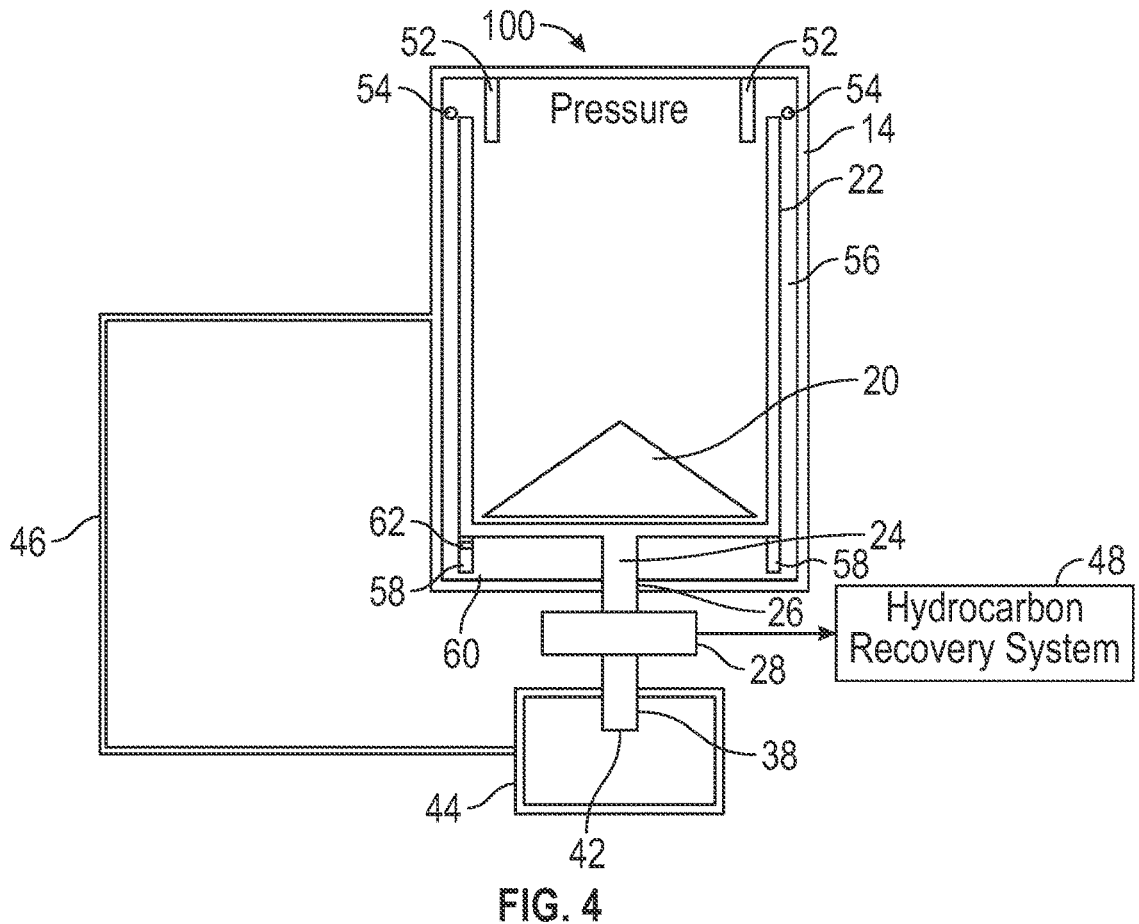
FIG. 4 is a diagram of an externally compensated load cell system and method in accord with one possible embodiment of the present invention.

FIG. 4 describes an externally compensated measurement system 100. The solution of FIG. 4 is built to avoid the problems of the previous two alternatives shown in FIG. 2 and FIG. 3. Like FIG. 2, the system of FIG. 4 has an external load cell, which provides the convenience of the access and reliability of an external load cell 28. The complexities related to the signal extraction required by the internal load cell of FIG. 3 are avoided. Compensation for pressure forces is more accurately available by counter acting with an opposite and equal force caused by the equal pressure in compensating body 44. The pressure that is present within the accumulator vessel 14 is transmitted to the compensating body 44. A compensating pressure is applied to compensating stem 42, which is the same cross-sectional area as the recipient stem 24 that projects out of the accumulator vessel 14. Compensating stem 42 extends through seal 38 in compensating vessel 44. Compensating stem 42 is slidably mounted with respect to compensating vessel 44 within seal 38. The variable pressure that is present in both the accumulator vessel 14 and the compensating vessel 14 is applied to the cross-section of the compensating stem 42 to produce a compensating force. Accordingly, pressure compensation for the variable pressure applied to the stem 24 is produced by inserting the compensating stem 42 into the compensating vessel or body 44. One or more compensator pressure feeding connections 46 between accumulator vessel 14 and compensating body or vessel 44 results in the same variable pressure being present in both the accumulator vessel 14 and the compensating vessel 44. In this way, the pressure within accumulator vessel 14 equals the pressure within compensating vessel 44. When system 100 is in an operating position or operating configuration as per FIG. 4, the recipient stem 24 is above the compensating stem 24.

However, it will be appreciated that because cross-sectional area of compensating stem 42 is known, whether the cross-sectional area is the same or different, the pressure effects can be electronically compensated for using calculations/algorithms that account for this factor.

The pressure compensated weight measurement system 100 aims to transmit the weight of solids 20 inside a pressure vessel 14 that contains a bucket or recipient 22 to the exterior of pressure vessel 14 for use by a computer or the like that may be connected to measure and/or control or signal a drilling system. The contents of pressure vessel 14 are normally flammable, toxic and corrosive fluids, which make the internal environment very harsh.

With that in mind, the compensator pressure feeding connections 46 need to be of the same mechanical construction as the main components, to ensure that the exposure to the harsh fluids and conditions will not lead to a pressure integrity failure. The weight reading of a load cell, such as external load cell is a correlation of the deformation caused over the cell strain gauges. Higher force results in more deformation over the strain gauge. The force coming from above the external load cell is composed of Stem weight; Bucket weight, solids weight plus the force from pressure over the stem area contribute to the readings of the load cell. Other factors, for which compensation can be calculated, include the friction of the bucket with the accumulator wall and the friction of the seals of the stem, which will reduce the load over the cell. From the bottom, the accumulator stem area is exposed to the same pressure as the above part, leading to the two stems compressing the core of the load cell, without having a relative deformation on strain gauge, which lead to a zeroing effect of the pressure related loads.

The present invention may be used with and/or as part of a hydrocarbon recovery system 48. Programming may be provided that utilizes weight measurement data produced by the external load cell for controlling the hydrocarbon recovery system 48.

As discussed above, the recipient or "bucket" is also an important element of the system 100. Since the friction forces with the walls can cause important negative effects on the measurements, three features are used to improve measurements and operational flexibility.

One feature is a set of rollers as indicated at 54 that are mounted between accumulator vessel 14 and recipient 22 to reduce the friction with the walls of accumulator vessel 14 and the recipient 22.

Another feature is a trap, which may comprise wall 52, which may be a ring or tubular that is mounted at the top and internally of the accumulator 14 to block sand flow and thereby reduce the likelihood of sand migration to the annular space 56 between recipient 22 and accumulator vessel 14.

Another feature is the bottom member 58 in a ring shape that extends downwardly toward the bottom of accumulator vessel 14. This creates a cavity or void space 60 between the recipient 22 and the bottom of the accumulator vessel 14, to allow some sand to eventually deposit, without interfering with the measurement. Additionally, the generally ring-shaped member 58 contains openings 62 to allow water flow and sand removal from the void space 60.

Various embodiments of the present invention may be utilized. As example for bigger accumulation recipients, non-cylindrical shape, as example in horizontal production separators, multiple load cells, with their respective systems, could be used to measure the load of the longer non cylindrical recipient. Alternatively, an individual load cell dedicated for the pressure related forces only could be used to acquire the pressure related forces, and then mathematically subtract from the other load cells that are seeing the full pressure plus weight forces, via software processing. In another embodiment, a second external load cell (not shown) may be connected to a compensating stem to measure the force produced by the compensating stem due to the pressure in the compensating vessel. Then a processor may be utilized to balance out the portion of the force on the first external load cell due to pressure acting on the recipient stem. This eliminates the need to connect both the recipient stem and compensating stem to the same external load cell, if desired. In another variation, a compensating stem may extend into the accumulator vessel itself, e.g., at the top of the accumulator vessel, and thereby apply a force to the second external load cell due to the compensator stem that is equivalent to the force acting on the recipient stem. Then the processor will balance out the forces as discussed above. If necessary, no need for the compensating vessel and connectors to the compensating vessel is eliminated. In another embodiment the compensating shaft could be smaller in diameter with compensation by software.

Accordingly, the foregoing description of the preferred embodiments of the invention has been presented for purposes of illustration and description only. It is not intended to be exhaustive or to limit the invention to the precise form disclosed; and many modifications and variations are possible in light of the above teaching. Such modifications and variations that may be apparent to a person skilled in the art are intended to be included within the scope of this invention as defined by the accompanying claims.

The invention claimed is:

1. A system for weight measurement of solids in a flow stream, comprising:
  an accumulator vessel connected to receive the flow stream;
    a recipient mounted in the accumulator vessel to receive solids from the flow stream;

a load cell positioned outside of the accumulator vessel;
a recipient stem connected to the recipient and to the load cell;
a compensating vessel;
a compensator pressure feeding connection that fluidly connects between the accumulator vessel and the compensating vessel; and
a compensating stem that extends into the compensating vessel and connects to the load cell.

2. The system of claim 1, wherein the recipient stem is positioned above the load cell and the compensating stem is positioned below the load cell when the system is in an operating configuration.

3. The system of claim 1, further comprising a solid recovery system in a hydrocarbon flowing system, and programming that utilizes weight measurement data produced by the load cell for controlling the hydrocarbon flowing system.

4. A method for weight measurement of solids in a flow stream, comprising:
connecting the flow stream to an accumulator vessel whereby a variable pressure from the flow stream is contained by the accumulator vessel;
inserting solids into a recipient mounted in the accumulator vessel;
connecting a recipient stem between the recipient and a load cell positioned outside of the accumulator vessel;
applying a force to the load cell through the recipient stem that comprises a weight force due to a weight of the solids in the recipient and a variable pressure force due to the variable pressure acting on the recipient stem;
applying the variable pressure to a compensating stem to produce a compensating force; and
utilizing the compensating force to more accurately determine the weight of the solids in the recipient.

5. The method of claim 4, wherein the step of applying the variable pressure to the compensating stem comprises inserting the compensating stem into a compensating vessel that is fluidly connected to the accumulator vessel.

6. The method of claim 5, further comprising connecting the compensating stem to the load cell.

7. The method of claim 6, further comprising positioning the recipient stem above the load cell and the compensating stem below the load cell.

8. The method of claim 6, further comprising providing programming that utilizes weight measurement data produced by the load cell for controlling a solid recovery system in a hydrocarbon flowing system.

9. A system for weight measurement of solids in a flow stream, comprising:
an accumulator vessel connected to receive the flow stream, the accumulator vessel being constructed to be able to contain a variable pressure;
a recipient mounted in the accumulator vessel to receive solids from the flow stream;
a load cell positioned outside of the accumulator vessel;
a recipient stem connected to the recipient and to the load cell so as to apply weight of the solids in the recipient to the load cell, the recipient stem being connected so that the variable pressure is applied to the recipient stem; and
a compensating stem that is connected to receive the variable pressure and produce a force acting on the compensating stem.

10. The system of claim 9, further comprising a compensating vessel, a compensator pressure feeding connection that fluidly connects between the accumulator vessel and the compensating vessel, the compensating stem being connected to receive the variable pressure by being inserted into the compensating vessel.

11. The system of claim 9 wherein the recipient stem is positioned above the load cell and the compensating stem is positioned below the load cell when the system is in an operating configuration.

12. The system of claim 9, further comprising a solid recovery system in a hydrocarbon flowing system, and programming that utilizes weight measurement data produced by the load cell for controlling the hydrocarbon flowing system.

13. The system of claim 1, further comprising a hydrocarbon recovery system.

14. The system of claim 9, further comprising a hydrocarbon recovery system.

15. The system of claim 1, further comprising rollers mounted between the recipient and the accumulator vessel to reduce the friction forces that can affect the measurements.

16. The system of claim 1, further comprising a recipient with a mechanical trap mounted to an internal top surface of the accumulator vessel to minimize sand migration into the annular space between the recipient and the accumulator.

17. The system of claim 1, further comprising a ringed support mounted to a bottom of the recipient, a channel through the ringed support allows water flow for sand removal.

* * * * *